Patented Apr. 23, 1940

2,198,318

UNITED STATES PATENT OFFICE 2,198,318

RESINOUS MATERIAL

Alexander N. Sachanen and Pharez G. Waldo, Woodbury, N. J., assignors to Socony-Vacuum Oil Company, Incorporated, New York, N. Y., a corporation of New York No Drawing. Application January 12, 1938, Serial No. 184,597

12 Claims. (Cl. 260—43)

This invention relates to the production of materials of a resinous nature. More particularly, the invention relates to the production of a homogeneous mixed resinous material.

It is an object of this invention to provide a means for producing homogeneous resinous materials comprising formaldehyde hydroxyaromatic resins. Another object of the invention is to provide a highly satisfactory homogeneous resinous material comprising phenolic resins which is less expensive to manufacture than pure phenolic resins. A more specific object of the invention is to provide homogeneous resinous materials comprising phenolic and solvent tar resins which partake generally of the mechanical characteristics of phenolic resins. These and many other objects will be obvious from the description of our invention.

In the past, phenols alone without admixture of other reactive substances have been treated with formaldehyde to form formaldehyde-phenolic resins. These formaldehyde-phenolic resins are very valuable; however, they also are relatively expensive resinous materials. Other substances such as sawdust, oils, glycerin, etc. are sometimes admixed as fillers to the finished resins before molding, and the use of such fillers reduces the cost of the resins to a certain degree but, unfortunately, only a limited amount of filler may be incorporated into the resin without causing a detrimental effect on the properties thereof.

In our copending application, Serial Number 184,596 filed January 12, 1938, we disclose that a resinous material comprising oil insoluble resins, oil soluble resins and unreacted oil is produced by treating solvent tars with a formaldehyde resinifying agent. In the usual practice this raw solvent tar resinous material is separated into its three components, viz. oil insoluble resins, oil soluble resins and unreacted oil by solvent extraction and distillation.

Our present invention is based upon the surprising discovery that formaldehyde or suitable derivatives thereof can be reacted under proper conditions with hydroxyaromatic compounds and a solvent tar to form a mixed resinous material which is homogeneous throughout. We have found that the hydroxyaromatic compound and the solvent tar can be mixed first and then reacted with the formaldehyde resinifying agent or the solvent tar may first be treated, at least partially, with the formaldehyde resinifying agent and then the hydroxyaromatic compound incorporated into the reaction mixture.

While we do not wish to be held to any theory as to the type of reactions that take place in our process, it does not appear at present that the phenols and solvent tar constituents, as such, react with each other, but rather each forms separate resins with the formaldehyde, and it is quite possible that these two types of resins react with each other, at least partially, to form mixed resinous compounds as distinguished from merely a mixed resinous mixture. Regardless of this, the resins produced are thoroughly homogeneous throughout and resemble formaldehyde phenolic resins in mechanical characteristics.

It, therefore, should be clear that our invention is of considerable advantage in that a very cheap material (solvent tar) is substituted, at least in part, for a relatively expensive material (phenol). Furthermore, the solvent tar is not an inactive filler detrimental to the properties of the formaldehyde resin, but rather enters into the reaction forming formaldehyde resins itself which are mixed in situ with the formaldehyde phenolic resins to yield a homogeneous resinous material.

Solvent tar is the well known rejected product obtained from the solvent refining of lubricant oils. In solvent refining a lubricating oil, a lubricant fraction of petroleum is contacted with solvents capable of exerting selective solvent properties upon the various constituents thereof for the purpose of separating the raw stock into two fractions. The raffinate or refined stock is a product of more highly paraffinic nature, more stable, of higher viscosity index, and a better lubricant. The solvent tar or discarded stock is more highly naphthenic and aromatic and of much lower viscosity index. As is well known, solvent tars vary in the amount of aromatic constituents which they contain. The aromaticity of the tars varies according to the crude oil from which the petroleum fraction is derived to make the solvent tar. Thus a solvent tar produced by refining a Coastal or a Mid-Continent oil is usually more highly aromatic than a solvent tar produced by refining a Pennsylvania oil.

For the purposes of our invention we may employ any solvent tar which contains aromatic constituents. However, better results are obtained by use of solvent tars containing relatively high percentages of aromatic constituents. For instance, it has been found that when the amount of non-aromatic hydrocarbons in the solvent tar used in our process is too large, the resins formed have a greasy appearance due to an excess of unreacted non-aromatic hydrocarbons. Accordingly, for our purposes we prefer to use solvent tars of the class which contain at least 65% of aromatic constituents (as measured by absorption with strong sulphuric acid) and especially suitable are the solvent tars containing at least 75% of aromatic constituents, such as a furfural solvent tar obtained from the treatment of distillates from Mirando crude. Other solvent tars which may be mentioned merely by way of example as suitable tars for the practice of our invention are the solvent tars obtained in the refining of distillates from East Texas crude and Rodessa crude. It is to be clearly understood, however, that the invention is not limited to the use of the specific tars mentioned, since solvent tars, in general, containing aromatic compounds may be used.

It has been found that hydroxyaromatic compounds in general, that is, aromatic compounds having a hydroxyl group attached directly to a carbon ring, may be used in the process. These hydroxyaromatic compounds with which the invention is concerned may be more clearly described by pointing out that they fall within the following general formulae:

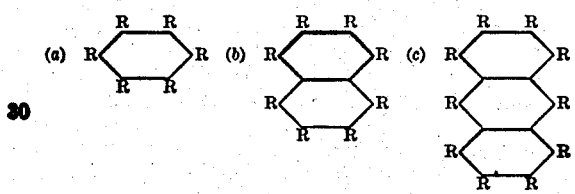

wherein at least one R represents a hydroxyl group and the other R's may be selected from the group of radicals consisting of hydrogen, hydroxy, alkyl, aryl, aralkyl, alkoxy, or aroxy. As examples of hydroxyaromatic compounds of the group above defined, we may name phenol, resorcinol, hydroquinone, catechol, xylenol, hydroxy-diphenyl, benzyl phenol, phenyl ethyl phenol, methyl-hydroxy-diphenyl, ethyl-hydroxy-diphenyl, guaiacol, the monoethylether of catechol, alpha and beta naphthol, alpha and beta methyl naphthol, phenyl naphthol, tolyl naphthol, xylyl naphthol, benzyl naphthol, monomethylether of dihydroxynaphthalene, anthranol, phenyl methyl anthranol, and the like. Of the above named materials, the preferred classes are the monohydroxy phenols wherein the remaining R's are hydrogen or alkyl. As to particular compounds, preference is given to the simpler phenols as phenol and beta naphthol. For convenience all the above type hydroxyaromatic compounds will be referred to broadly as phenols. It is to be understood thereby that the term a phenol embraces polycyclic compounds as well as moncyclic.

The ratio of solvent tar to hydroxyaromatic compound can vary over wide limits. However, we prefer not to use a substantial excess of solvent tar. Excellent results are obtained when the solvent tar and hydroxyaromatic compound are present in about equal portions. It has been found that the resins produced when using an excess of solvent tar in comparison with the hydroxyaromatic compound (for instance two parts of solvent tar per one part of hydroxyaromatic compound) have a greasy appearance similar to that of the resins produced by using solvent tars containing a high percentage of non-aromatic constituents.

It is to be understood that in place of formaldehyde the various similarly acting derivatives thereof may be employed as the resinifying agent, such as paraformaldehyde and hexamethylenetetramine. In view of the fact that all of these compounds have formaldehyde as a basis, for convenience they will be referred to hereinafter in the specification and claims as formaldehyde resinifying agents.

The resinifying reactions are carried out in the presence of an acid catalyst and while sulphuric acid is preferred, the invention is not limited thereto, but rather mineral acids in general, of similar strength, such as hydrochloric, etc. may be used to give the desired acidity. It is to be noted that when phenol is initially present in the mixture to be reacted, relatively little acid needs to be added due to the high reactivity of the phenol. However, when the solvent tar and formaldehyde resinifying agent are first partially reacted and then the phenol incorporated, a larger amount of acid should be used. For instance, in Example 3, given hereinbelow, only 9 c.c. of 90% sulphuric acid are added, while in Example 4 where the phenol is not added until after the first half hour, 100 c.c. of 95% sulphuric acid are used. After completion of the reaction, water or acetic acid may be added to dilute the reaction mixture so as to aid in removal of the sulphuric acid.

The resinous material formed can be ground to a powder which powder can be molded under suitable conditions of temperature and pressure. Usually a temperature of about 150° C. and a pressure of about two tons per square inch are suitable. The resulting resins exhibit the mechanical properties of phenolic resins, and their color is very light yellow to dark brown depending upon the solvent tar used. The resins are insoluble in oils.

The invention will be further illustrated by the following specific examples.

(1) Approximately equal parts (by volume) of phenol and solvent tar are mixed and while stirring continuously reacted with two parts of formaldehyde (30%) in the presence of a small amount of sulphuric acid (90%) for a period of fifteen minutes or more. The resin formed is ground to a powder and washed with water to remove sulphuric acid and any excess of formaldehyde. The resultant powder is then molded at a temperature of about 150° C. and under a pressure of about two tons per square inch.

(2) One part of a solvent tar is stirred with two parts of formaldehyde (30%) in the presence of two parts of sulphuric acid (90%) for a period of one half hour. The mixture formed is diluted with water and then one part of phenol is added slowly. The resin formed is similar to that of Example 1.

(3) 50 gr. furfural tar (from the treatment of lube distillates of Mirando crude)

Phenol _____gr__ 50
Formaldehyde _____cc__ 80
Sulphuric acid (90%) _____cc__ 9

Sulphuric acid is added slowly and as the reactions are exothermic, the temperature raises to 90° C. The mixture is stirred at this temperature for ¾ hour. The yield of resin is about 110 gr.

(4) Furfural tar_____gr__ 50
   Formaldehyde _____cc__ 100
   Sulphuric acid (95) _____cc__ 100

The mixture is stirred for one half hour and then diluted with 100 cc. water.

50 cc. more formaldehyde are added and 50 gr. phenol are admixed slowly.

The yield of resin is about 110 gr.

Since certain changes may be made in the invention without departing from the scope thereof, it is intended that all matter contained in the above description shall be interpreted as illustrative and not in a limiting sense.

We claim:

1. As new compositions of matter a homogeneous mixed resinous material comprising the reaction product of a petroleum solvent tar containing a predominant proportion of aromatic constituents and a phenol with a formaldehyde resinifying agent in the presence of a strong mineral acid catalyst.

2. As new compositions of matter a homogeneous mixed resinous material comprising the reaction product of a phenol and a petroleum solvent tar containing at least 65% of aromatic constituents with a formaldehyde resinifying agent in the presence of a strong mineral acid catalyst.

3. As new compositions of matter the homogeneous mixed resinous materials comprising the reaction product of a phenol and a petroleum solvent tar containing at least 75% of aromatic constituents with formaldehyde in the presence of a strong mineral acid catalyst.

4. As a new composition of matter a homogeneous mixed resinous material produced by treating a mixture of a phenol and petroleum solvent tar containing at least 65% of aromatic constituents, the solvent tar being present in not substantially more than equal amount by weight, with a formaldehyde resinifying agent in the presence of a strong mineral acid catalyst.

5. As a new composition of matter a homogeneous mixed resinous material produced by treating a mixture of substantially equal proportions by weight of a phenol and a petroleum solvent tar containing at least 65% of aromatic constituents with a formaldehyde resinifying agent in the presence of a strong mineral acid catalyst.

6. As a new composition of matter a homogeneous mixed resinous material produced by treating a mixture of substantially equal proportions by weight of phenol and a petroleum solvent tar containing at least 75% aromatic constituents with formaldehyde in the presence of sulfuric acid as a catalyst.

7. The process for producing a homogeneous mixed resinous material which comprises treating a petroleum solvent tar containing a predominant proportion of aromatic constituents and a phenol in the presence of one another with a formaldehyde resinifying agent in contact with a strong mineral acid catalyst.

8. The process for producing a homogeneous mixed resinous material which comprises treating a petroleum solvent tar containing at least 65% aromatic constituents and a phenol in the presence of one another with a formaldehyde resinifying agent in contact with a strong mineral acid catalyst.

9. The process for producing a homogeneous mixed resinous material which comprises reacting a mixture of a phenol and a petroleum solvent tar containing at least 65% of aromatic constituents, the solvent tar being present in not substantially more than equal proportions by weight, with a formaldehyde resinifying agent in contact with a strong mineral acid catalyst.

10. The process for producing a homogeneous mixed resinous material which comprises reacting a mixture of substantially equal proportions by weight of a petroleum solvent tar containing at least 65% of aromatic constituents and a phenol with a formaldehyde resinifying agent in contact with a strong mineral acid catalyst.

11. The process for producing a homogeneous mixed resinous material which comprises reacting a mixture of substantially equal proportions by weight of phenol and a petroleum solvent tar containing at least 75% of aromatic constituents with formaldehyde in contact with sulfuric acid as a catalyst.

12. The process for producing resinous material which comprises reacting a petroleum solvent tar containing at least 65% of aromatic constituents with an excess of formaldehyde in the presence of a strong mineral acid catalyst and then adding a phenol to said reaction mixture and effecting a further reaction between the components of said reaction mixture and the phenol to form a homogeneous mixed resinous material.

ALEXANDER N. SACHANEN.
PHAREZ G. WALDO.